Patented Jan. 27, 1931                                        1,790,514

UNITED STATES PATENT OFFICE

BENJAMIN H. THURMAN, OF TUCKAHOE, NEW YORK, ASSIGNOR TO GOLD DUST CORPORATION, OF NEW YORK, N. Y., A CORPORATION OF NEW JERSEY

PROCESS OF BLEACHING OIL

No Drawing.         Application filed March 18, 1926. Serial No. 95,782.

Linseed oil has many uses in the arts. It is used chiefly in the manufacture of paints, varnishes and lacquers. In many of its uses it is desirable that it have all of its natural structure and also that it be substantially water white. Raw linseed oil has a distinct color which is objectionable in many of the uses to which the oil is put. Many processes of bleaching the oil to whiten it have been devised, many of such processes consisting in the use of some chemical substance or other material which results in changing the natural constituents of the oil by producing some chemical change to remove the color. Heat bleaching has also been used heretofore, but has been carried out in such a way that it resulted in an oil which ultimately has had a color sufficiently distinct to render it undesirable for many of the high grade uses to which it was desired to put the oil.

I have devised a method by which a substantially water white oil is produced with all of its natural constituents, the treatment being so carried out that the oil retains its water white color indefinitely. Such an oil has been sought for many years, but so far as I am aware has never been produced heretofore.

The starting oil referred to in the following example is preferably made from thoroughly cleaned flaxseeds, that is, wherein the dockage is not more than 1% to 1½%. The oil is extracted from the seeds by cold pressing. That is to say, the expulsion of the oil is so regulated that the temperature of the oil running through the screen to the drip-pan is between 90° and 100° F. The oil coming from the expeller may contain slight traces of moisture and fine particles of meal. In order to remove the meal a small quantity of the oil may be run into a tank of about five to six barrels capacity. To this oil about 100 pounds of diatomaceous earth is added and the mixture is thoroughly agitated by air. This mixture is then run into a filter press. This small quantity mixed with the diatomaceous earth causes the formation of a filter layer on the filter units and then a large quantity of the untreated oil may be run through the filters, which assures a very clear and brilliant oil. This oil after filtering shows about .60 acid number, color about 50 yellow, 5.3 red. This oil is called TA oil herein. If this TA oil be subjected to bleaching with fuller's earth or bleaching carbon, or both, it is called herein PMP oil.

While I prefer to use oil made as above described as a starting material, I have found that I can also use ordinary raw linseed oils which have been previously subjected to refining agents, such as caustic soda, acids, and the like, all of which agents affect the quality of the oil as well as change the color components or the color-forming materials in a material manner. In thus altering the color materials and color-forming materials, these agents leave objectionable impurities.

While my process is useful when applied to the last-mentioned oils and results in a product of much better color and quality than can be produced by such refining agents alone, nevertheless it does not result in as good an oil as does the application of my process to the TA and PMP oils resulting from the cold pressing and other treatment above described, because the previous chemical treatment has affected the quality and composition of the original starting oil.

When the starting oil is the TA oil (cold pressed) or PMP, the resultant product, after it has been subjected to my process, has a color of approximately 8 yellow and .5 to .8 red, together with the following characteristics:

| Oil | Color | Acid No. | Viscosity | Iodin No. | Gravity |
|---|---|---|---|---|---|
| TA | 35y—5.3R to 50y—7R | .6 to 1 | 1½ seconds | 180 to 198 | .932 to .934 |
| PMP | 10y—1R to 20y—2R | .6 to 1 | 1½ seconds | 180 to 198 | .932 to .934 |

| Oil | F. F. A. | Refractive index | Bodying rate | Unsaponifiable matter | Phosphorus content |
|---|---|---|---|---|---|
| TA | .3 to .5 | 1.4793 | 1 to 5 hrs. | 1.07 | Less than .001 |
| PMP | .3 to .5 | 1.4792 | 1 to 4 hrs. | .76 | Less than .002 |

When the starting oil is one which has been previously refined by chemical agents, such as caustic soda and acids, it has, after being subjected to my process, a color of about 8 yellow, .5 to .8 red. But its composition has been somewhat altered by the chemical refining agents previously used, the alteration being dependent upon the nature of the refining material used.

The method which I prefer to use is as follows: An oil such as that heretofore described as the starting oil is placed in a closed container provided with means for raising the temperature of the oil; is heated to a temperature in excess of 500° F., but preferably not above, approximately 540° F., while a vacuum is maintained on the oil by a suitable vacuum pump. Preferably this vacuum should be about 29 inches, or better. The oil is maintained at the above temperature until a test sample shows that it has been bleached to the proper degree, whereupon it is removed from the vessel and quickly chilled to a temperature of about 200° or lower.

The length of time to which the oil is subjected to the temperature depends primarily upon the temperature used. That is to say, if the oil is heated to a temperature of about 540° F., the length of time at which it is maintained at that temperature would be shorter than if the temperature were, say 500° F. The time can be determined by taking a test sample and determining whether or not it has been bleached to the desired degree.

I prefer to introduce steam into the bottom of the heating vessel during the heating period, although the process may be carried out without the use of steam. In my opinion, the use of steam minimizes the yellowing effect of the oil when it is allowed to dry, either in paint or in varnish.

It will be noted that during the process above described, no chemicals of any kind have been added to the oil and apparently no substantial chemical change has taken place in its composition. The oil therefore has substantially all of its natural characteristics, that is, substantially the same iodine number, substantially the same saponification number, substantially the same acid number and substantially the same percentage of unsaponifiable matter as the original starting oil. The only substantial change which has taken place in the oil is that its color has been reduced so that it is substantially water white.

As is well known, the glycerides are the essential and characteristic constituents of linseed oil and impart to the oil its valuable properties. The non-oleaginous or foreign substances, such as color, mucilage, foots, moisture and fatty acids, which are usually present in linseed oil are not the valuable constituents of the oil, but are usually harmful. The only change which my process effects in the oil is in that of the coloring matter and perhaps some other foreign constituents, but it does not produce any substantial change in the glycerides, as shown by the data from the table given below, which shows the characteristic constituents before treatment and after treatment.

When my process is used on TA or PMP oil the original composition of the oil is not substantially affected thereby; that is, the glycerides which are composed of fatty acids and glycerine combined are not substantially split up into glycerine or fatty acids, nor does any substantial polymerization take place as a result of my process. By polymerization I mean the doubling up of two or more molecules of glycerides whereby they are condensed or joined to each other. As evidence that no substantial change in the structure has been made, I have made repeated analyses of the oil before and after my treatment and these analyses show that the constants of the original oil have not been substantially changed by my treatment. One set of constants which I have determined, is as follows:

|  | Before treatment | After treatment |
|---|---|---|
| Iodin number | 189.6 | 189 |
| Saponification number | 190.9 | 191 |
| Acid number | .6 | .7 |
| Color | 35Y-7R | 10Y-.9R |
| Unsaponifiable matter | 1.35% | 1.38% |

The slight differences in the values given in the above tabulation are due to experimental error, it being impossible for the analyst to produce identical results beyond the decimal point.

In all color measurements mentioned herein the results were secured with the Lovibond tintometer with 5¼ inch column of oil.

Slight variations in temperature and other features may be made in my process without losing its benefits and without departing from the spirit of my invention.

I claim:

1. The process of bleaching linseed oil free from mucilaginous matter precipitable by heat, which consists in heating the oil in a vacuum in excess of 500° F., but not about 540° F., until the desired bleaching is effected, and immediately chilling the heated oil to approximately 200° F.

2. The process of bleaching linseed oil free from mucilaginous matter precipitable by heat, which consists in heating the oil in excess of 500° F., but not above 540° F., in the presence of steam and under vacuum until the desired bleaching is effected, and rapidly chilling the oil to approximately 200° F.

3. The process of bleaching linseed oil free from mucilaginous matter precipitable by heat, which consists in heating the oil in a vacuum to approximately 540° F. until the desired bleaching is effected and rapidly cooling the oil to about 200° F.

4. The process of bleaching linseed oil free from mucilaginous matter precipitable by heat, which consists in heating the oil in a vacuum and in the presence of steam to approximately 540° F. for from about 10 minutes to 1 hour and rapidly cooling the oil to 200° F.

BENJAMIN H. THURMAN.